US010880734B2

(12) United States Patent
Lu et al.

(10) Patent No.: US 10,880,734 B2
(45) Date of Patent: Dec. 29, 2020

(54) METHOD FOR PAIRING BLUETOOTH DEVICE WITH MOBILE DEVICE AND APPARATUS THEREOF (71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

(*) Notice: Subject to any disclaimer, the term of this patent is extended or adjusted under 35 U.S.C. 154(b) by 0 days.

(21) Appl. No.: 16/425,876

(22) Filed: May 29, 2019

(65) Prior Publication Data
US 2019/0281450 A1 Sep. 12, 2019

Related U.S. Application Data (63) Continuation of application No. PCT/CN2018/090753, filed on Jun. 12, 2018.

(30) Foreign Application Priority Data

Jul. 4, 2017 (CN) .......................... 2017 1 0536271

(51) Int. Cl.
*H04W 12/00* (2009.01)
*H04W 76/18* (2018.01)
(Continued)

(52) U.S. Cl.
CPC ........... *H04W 12/003* (2019.01); *H04W 4/00* (2013.01); *H04W 12/0608* (2019.01);
(Continued)

(58) Field of Classification Search
CPC ..... H04W 12/003; H04W 4/00; H04W 76/00; H04W 76/18; H04W 76/14; H04W 12/0608; H04W 4/80; H04W 8/005
See application file for complete search history.

(56) References Cited

U.S. PATENT DOCUMENTS

2012/0172060 A1 7/2012 Qing et al.
2014/0179234 A1 6/2014 Lee et al.
(Continued)

FOREIGN PATENT DOCUMENTS

CN 101626256 A 1/2010
CN 102118186 A 7/2011
(Continued)

OTHER PUBLICATIONS

DJhon, "Bluetooth pairing not working", Oct. 2016, Stackoverflow. (Year: 2016).*
(Continued)

*Primary Examiner* — Peter P Chau
(74) *Attorney, Agent, or Firm* — J.C. Patents (57) ABSTRACT The present disclosure provides a method for paring a Bluetooth device with a mobile device and an apparatus thereof, by monitoring a Bluetooth pairing request broadcasted by a system program via a filter registered in operating system, intercepting the Bluetooth pairing request broadcasted by the the system program, popping up a preset PIN code pairing inputting box at an interface of the operating system and receiving an PIN code input by a user, pairing the mobile device with a target Bluetooth device according to the PIN code input by the user, and obtaining a pairing result of pairing the mobile device with target Bluetooth device, determining whether the target Bluetooth device and the target Bluetooth device are paired successfully according to the pairing result of pairing the mobile device with target Bluetooth device, if yes, a paring is successful; otherwise, the pairing is unsuccessful.

20 Claims, 4 Drawing Sheets (51) Int. Cl.
*H04W 76/14* (2018.01)
*H04W 12/06* (2009.01)
*H04W 4/00* (2018.01)
*H04W 76/00* (2018.01)

(52) U.S. Cl.
CPC .......... *H04W 76/00* (2013.01); *H04W 76/14* (2018.02); *H04W 76/18* (2018.02)

(56) References Cited

U.S. PATENT DOCUMENTS

| | | | | |
|---|---|---|---|---|
| 2018/0219845 A1* | 8/2018 | Sumiuchi | .............. | G06F 3/1292 |
| 2018/0285039 A1* | 10/2018 | Kawai | .................... | G06F 3/1221 |
| 2019/0159030 A1* | 5/2019 | Lim | .......................... | H04L 9/30 |

FOREIGN PATENT DOCUMENTS

| | | |
|---|---|---|
| CN | 103561479 A | 2/2014 |
| CN | 104320161 A | 1/2015 |
| CN | 104917551 A | 9/2015 |
| CN | 104967971 A | 10/2015 |
| CN | 205071315 U | 3/2016 |
| CN | 105846863 A | 8/2016 |
| CN | 106059635 A | 10/2016 |
| CN | 106412656 A | 2/2017 |
| CN | 107257540 A | 10/2017 |

OTHER PUBLICATIONS

Sandip Jadhav, "How to pair Bluetooth device programmatically Android", Jun. 2013, Stackoverflow. (Year: 2013).*
Lily, "Auto-accept Bluetooth pairing possible?", Sep. 2011, Stackoverflow. (Year: 2011).*
Meng Tim, "How to use broadcast receiver to listen to Bluetooth pairing request?", Apr. 2016, Stackoverflow. (Year: 2016).*
David, "Programmatically bonding to BLE device on Android", Aug. 2015, Stackoverflow. (Year: 2015).*
Firefly, "How to programmatically pair a Bluetooth device on Android", Feb. 2011, Stackoverflow (Year: 2011).*
The Chinese First Examination Report of corresponding Chinese application No. 201710536271.2, dated Jun. 19, 2019.
The International Search Report of corresponding international application No. PCT/CN2018/090753, dated Aug. 31, 2018. x.
The Chinese Second Examination Report, including Chinese Search Report of corresponding Chinese application No. 201710536271.2, dated Sep. 19, 2019.

* cited by examiner

METHOD FOR PAIRING BLUETOOTH DEVICE WITH MOBILE DEVICE AND APPARATUS THEREOF

CROSS-REFERENCE TO RELATED APPLICATIONS

The present application is a continuation of International Application No. PCT/CN2018/090753, filed on Jun. 12, 2018, which claims priority to Chinese Patent Application No. 201710536271.2, filed on Jul. 4, 2017 and entitled "Method for paring Bluetooth device with mobile device and apparatus thereof". The disclosures of the aforementioned applications are hereby incorporated by reference in their entireties.

FIELD OF THE DISCLOSURE

The present disclosure relates to the field of communication, more particularly, to a method for paring a Bluetooth device with a mobile device and an apparatus thereof.

BACKGROUND OF THE DISCLOSURE

At present, Bluetooth technology has updated to Bluetooth version 4.0. As supplement of Bluetooth specification 3.0+HS, the Bluetooth version 4.0 is specific to a wireless solution with high cost and high power consumption, which can be widely used in fields such as health care, sports and fitness, domestic entertainment, safety and security, etc. A lot of products are based on Bluetooth 4.0, for example, ranged from accessories such as an initial earphone, a sound box, a wrist band, a key board, a mouse, a joystick, etc, to application scenarios such as August Bluetooth door lock, car testing of Tencent Lubao box, Xiaomi segway controlling, etc, which are appeared as the development of smart devices such as smart phones and tablet computers. Therefore Bluetooth technology becomes more and more widespread in society.

Most of the Bluetooth devices are connected to mobile devices such as smart phones, tablet computer, etc, to meet the request of humans to smart life. To a great extent, Bluetooth technology masters access to a mobile device and a peripheral device. In addition, Most Bluetooth devices require PIN code or pairing password authentication before connecting to the mobile devices.

However, there is no unified standard for connecting a mobile device and a Bluetooth device for mobile device manufacturers. When a user uses different mobile devices to connect to one Bluetooth device, pairing situations are varied. Therefore, when the user use different mobile devices, the user is required to re-adapt appear manner and input mode of the PIN code when the mobile device connects to the Bluetooth device, which brings bad experience to the user. For example, when mobile devices pair a Bluetooth device for connection, some mobile device will pop up a boxin the screen for a user to input the password directly, some mobile device will prompt pairing information, then the user is required to manually slip and click the pairing information to input the PIN code, in such a way, time is wasted and the user experience become bad. In other cases, PIN codes of some devices are constant and the user has to input the same PIN code each time, which also wastes time and energy of the user and makes the user experience become bad.

SUMMARY OF THE DISCLOSURE

In order to solve the problem in the prior art, an objection of the present disclosure is to provide a method for paring a Bluetooth device with a mobile device and an apparatus thereof.

The present disclosure provides a method for pairing a Bluetooth device with a mobile device, including:

Step 101, monitoring a Bluetooth pairing request broadcasted by a system program via a filter registered in an operating system;

Step 102, intercepting the Bluetooth pairing request broadcasted by the system program when the Bluetooth pairing request broadcasted by the system program is monitored via the filter;

Step 103, popping up a preset PIN code pairing inputting box at an interface of the operating system and receiving a PIN code input by a user;

Step 104, pairing the mobile device with a target Bluetooth device according to the PIN code input by the user; and Step 105, obtaining a pairing result of pairing the mobile device with target Bluetooth device, determining whether the mobile device and the target Bluetooth device are paired successfully according to the pairing result of pairing the mobile device with target Bluetooth device, if yes, a paring is successful; otherwise, the pairing is unsuccessful.

The present disclosure provides an apparatus for pairing a Bluetooth device with a mobile device, including:

a monitoring module, configured to monitor a Bluetooth pairing request broadcasted by a system program via a filter registered in an operating system;

an intercepting module, configured to intercept the Bluetooth pairing request broadcasted by the system program when the monitoring module monitors the Bluetooth pairing request broadcasted by the system program;

a popping up module, configured to pop up a preset PIN code pairing inputting box at an interface of the operating system when the intercepting module intercepts the Bluetooth pairing request broadcasted by the system program;

a receiving module, configured to receive a PIN code input by a user;

a first pairing module, configured to pair the mobile device with a target Bluetooth device according to the PIN code input by the user received by the receiving module;

a first obtaining module, configured to obtain a pairing result of the first pairing module; and a first determining module, configured to determine whether the mobile device and the target Bluetooth device are paired successfully according to the pairing result obtained by the first obtaining module, if yes, the pairing is successful, otherwise, the pairing is unsuccessful.

Compared with the prior art, the present disclosure has the following advantages:

in the method for pairing a Bluetooth device with a mobile device and the apparatus thereof provided by the present disclosure; when a Bluetooth pairing request initialized by a system program is monitored, an application intercepts the Bluetooth pairing request, prevents the mobile device from popping up a PIN code pairing box; if no PIN code is built in the application, a PIN code pairing inputting box is popped up, which is used for obtaining and setting the PIN code to complete subsequence Bluetooth pairing process; if a PIN code is built in the application, there is no need for a user to input the PIN code manually, and the Bluetooth paring process is completed directly, which saves the time and energy of the user is saved and provides a better user experience in terms of the connection of the Bluetooth device and the mobile device.

DETAILED DESCRIPTION

Technical solutions of the embodiments of the present disclosure are described clearly and completely in conjunction with the accompanying drawings of the present disclosure as follows. Apparently, the described embodiments are merely a part of but not all of the embodiments according to the present disclosure. Based on the described embodiments of the present disclosure, all the other embodiments obtained by those of ordinary skill in the art without any creative work belong to the protection scope of the present disclosure.

Embodiment 1

Figure 1:
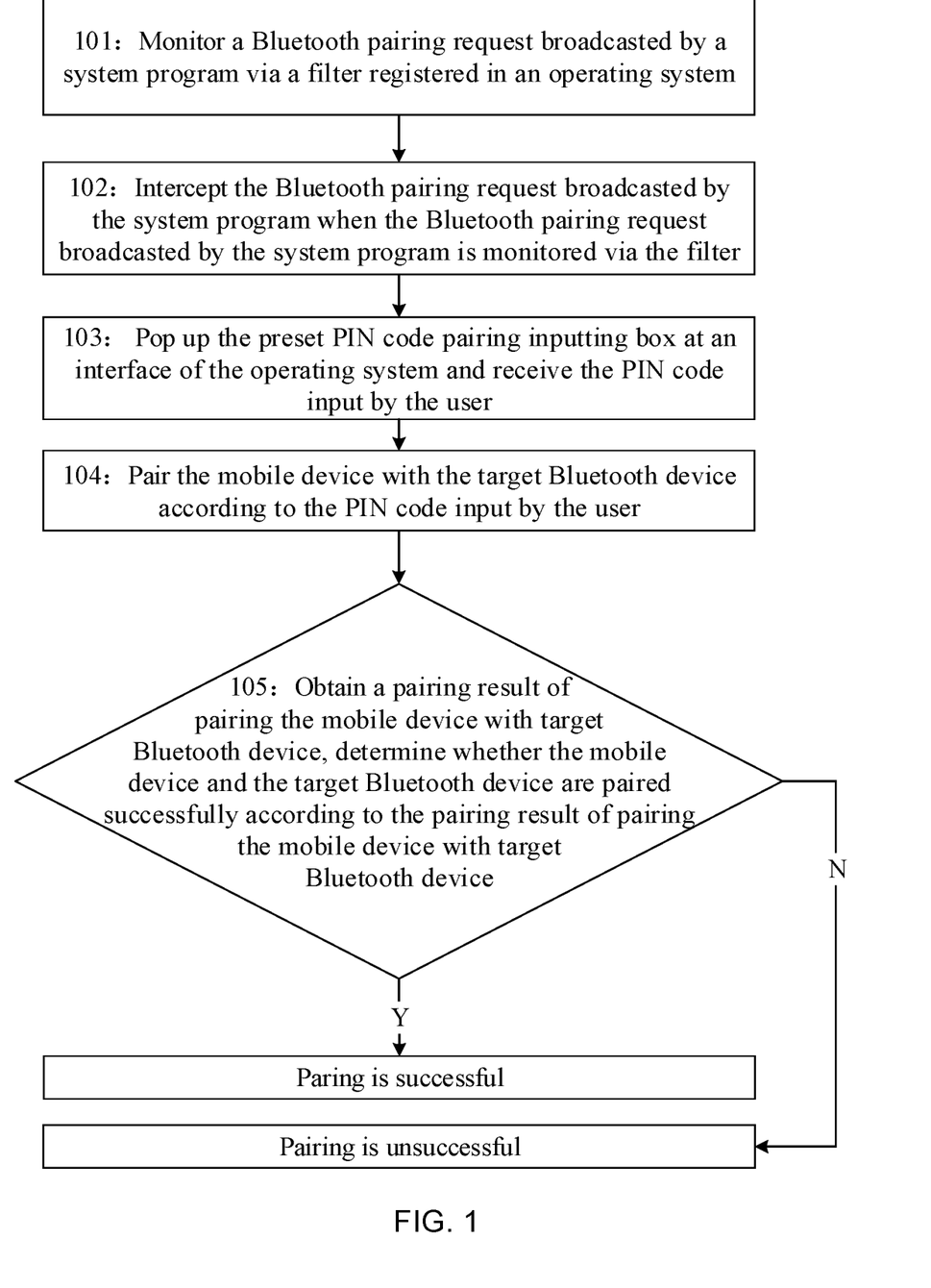
FIG. 1 is a flow chart of a method for pairing a Bluetooth device with a mobile device provided by Embodiment 1 of the present disclosure.

As shown by FIG. 1, Embodiment 1 provides a method for pairing a Bluetooth device with a mobile device. The method includes the following steps.

Step 101: monitor a Bluetooth pairing request broadcasted by a system program via a filter registered in an operating system;

further, before step 101, the method includes Step A: add a Bluetooth pairing request event, register a Bluetooth pairing request event filter;

further, Step A specifically includes adding the Bluetooth pairing request event by using an addAction method of IntentFilter class and register the Bluetooth pairing request event filter by using a registerReceiver method to;

Further, before Step 101, the method further includes Step B: when receiving information of the target Bluetooth device selected by the user from a target Bluetooth device list, determine whether the mobile device has been successfully paired with the target Bluetooth device corresponding to the information of the target Bluetooth device selected by the user, if yes, the pairing is successful; otherwise, execute Step 101;

further, before Step B, the method includes: invoke postDelayed( ) function to set a time for scanning Bluetooth devices, use a startLeScan method of BluetoothAdapter to scan Bluetooth devices within a valid scope around the mobile device, and obtain the target Bluetooth device list when a scanning time reaches the set time for scanning Bluetooth devices.

Step 102: intercept the Bluetooth pairing request broadcasted by the system program when the Bluetooth pairing request broadcasted by the system program is monitored via the filter;

further, Step 102 is specifically intercept the Bluetooth pairing request of system program broadcasted by using a onReceive method of BroadcastReceiver class and invoke abortBroadcast( ) function interface when the Bluetooth pairing request broadcasted by the system program is monitored via the filter.

Further, between Step 102 and Step 103, the method further includes determine whether it is required for the user to input a PIN code of the target Bluetooth device, if yes, execute Step 103; otherwise, pair the mobile device with the target Bluetooth device according to a built-in PIN code of the target Bluetooth device, and then execute Step 105;

further, when it is determined that it is required for the user to input the PIN code of the target Bluetooth device, after it is determined that the pairing is unsuccessful in Step 105, the method further includes: delete the built-in PIN code of the target Bluetooth device;

further, when it is determined that it is required for the user to input the PIN code of the target Bluetooth device, after it is determined that the pairing is unsuccessful in Step 105, the method further includes: pop up a PIN code pairing inputting box, obtain the PIN code of the target Bluetooth device input by the user via the PIN code pairing inputting box, perform a PIN code pairing on the mobile device and the target Bluetooth device, determine whether the mobile device and the target Bluetooth device are paired successfully, when the mobile device and the target Bluetooth device are paired successfully, replace the built-in PIN code of the target Bluetooth device with the obtained PIN code of the target Bluetooth device; when the mobile device and the target Bluetooth device are paired unsuccessfully, delete the built-in PIN code of the target Bluetooth device.

Further, between Step 102 and Step 103, the method includes: determine whether a built-in PIN code exists, if it is determined that the built-in PIN code exists, pair the mobile device with the target Bluetooth device according to the built-in PIN code, determine whether the mobile device and the target Bluetooth device are paired successfully, if yes, the pairing is successful; otherwise, the pairing is unsuccessful, then delete the built-in PIN code; if it is determined that the built-in PIN code does not exist, execute Step 103;

further, when it is determined that the built-in PIN code exists and the mobile device and the target Bluetooth device are paired unsuccessfully, the method further includes: pop up the PIN code pairing inputting box, obtain a PIN code of the Bluetooth device input by the user via the PIN code pairing inputting box, perform the PIN code pairing on the mobile device and the target Bluetooth device, when the mobile device and the target Bluetooth device are paired successfully, replace the built-in PIN code with the obtained PIN code of the target Bluetooth device;

further, when it is determined that the PIN code exists and the mobile device and the target Bluetooth device are not paired successfully, the method further includes:

Step C1: set an error count threshold and set an initial operating count;

Step C2: pop up the PIN code pairing inputting box, obtain the PIN code of the target Bluetooth device input by the user via the PIN code pairing inputting box, perform the PIN code pairing on the mobile device and the target Bluetooth device, determine whether the mobile device and the target Bluetooth device are paired successfully, if the mobile device and the target Bluetooth device are not paired successfully, update the operating count and determine whether the operating count is greater than the error count threshold, if yes, report error, otherwise, go back to Step C2.

Step 103: pop up the preset PIN code pairing inputting box at an interface of the operating system and receive the PIN code input by the user;

further, Step 103 specifically is: pop up the preset PIN code pairing inputting box at the interface of the operating system according to a length, a width and a left corner coordinate position of the preset PIN code pairing inputting box, receiving the PIN code input by the user;

further, Step 103 specifically is: pop up the preset PIN code pairing inputting box at the interface of the operating system by using inputPin method, and receiving the PIN code input by the user.

Step 104: pair the mobile device with the target Bluetooth device according to the PIN code input by the user;

Step 104 specifically is: pair the mobile device with the target Bluetooth device according to the PIN code input by the user by using a setPin method of ClsUtils class.

Step 105: obtain a pairing result of pairing the mobile device with target Bluetooth device, determine whether the mobile device and the target Bluetooth device are paired successfully according to the pairing result of pairing the mobile device with target Bluetooth device, if yes, a paring is successful; otherwise, the pairing is unsuccessful;

further, in Step 105, the determine whether the mobile device and the target Bluetooth device are paired successfully specifically is: determine whether the mobile device and the target Bluetooth device are paired successfully according to a getBondState method of BluetoothDevice class;

further, after it is determined that the mobile device and the target Bluetooth device are paired successfully in Step 105, the method further includes: set the obtained PIN code of the target Bluetooth device as the built-in PIN code;

further, after it is determined that the mobile device and the target Bluetooth device are paired unsuccessfully in Step 105, the method further includes:

Step D1: set an error count threshold and setting an initial operating count;

Step D2: pop up the PIN code pairing inputting box, obtaining the PIN code of the target Bluetooth device input by the user via the PIN code pairing inputting box, perform the PIN code pairing on the mobile device and the target Bluetooth device, determine whether the mobile device and the target Bluetooth device are paired successfully, if the mobile device and the target Bluetooth device are not paired successfully, update the operating count and determine whether the operating count is greater than the error count threshold, if yes, report error, otherwise, go back to Step D2;

further, Step 105 further includes: display pairing successful information when it is determined that the pairing is successful; display pairing unsuccessful information when it is determined that the pairing is unsuccessful.

In the method for pairing a Bluetooth device with a mobile device and the apparatus thereof provided by the present disclosure; when a Bluetooth pairing request initialized by a system program is monitored, an application intercepts the Bluetooth pairing request, prevents the mobile device from popping up a PIN code pairing box; if no PIN code is built in the application, a PIN code pairing inputting box is popped up, which is used for obtaining and setting the PIN code to complete subsequence Bluetooth pairing process; if a PIN code is built in the application, there is no need for a user to input the PIN code manually, and the Bluetooth paring process is completed directly, which saves the time and energy of the user is saved and provides a better user experience in terms of the connection of the Bluetooth device and the mobile device.

Embodiment 2

Figure 2A:
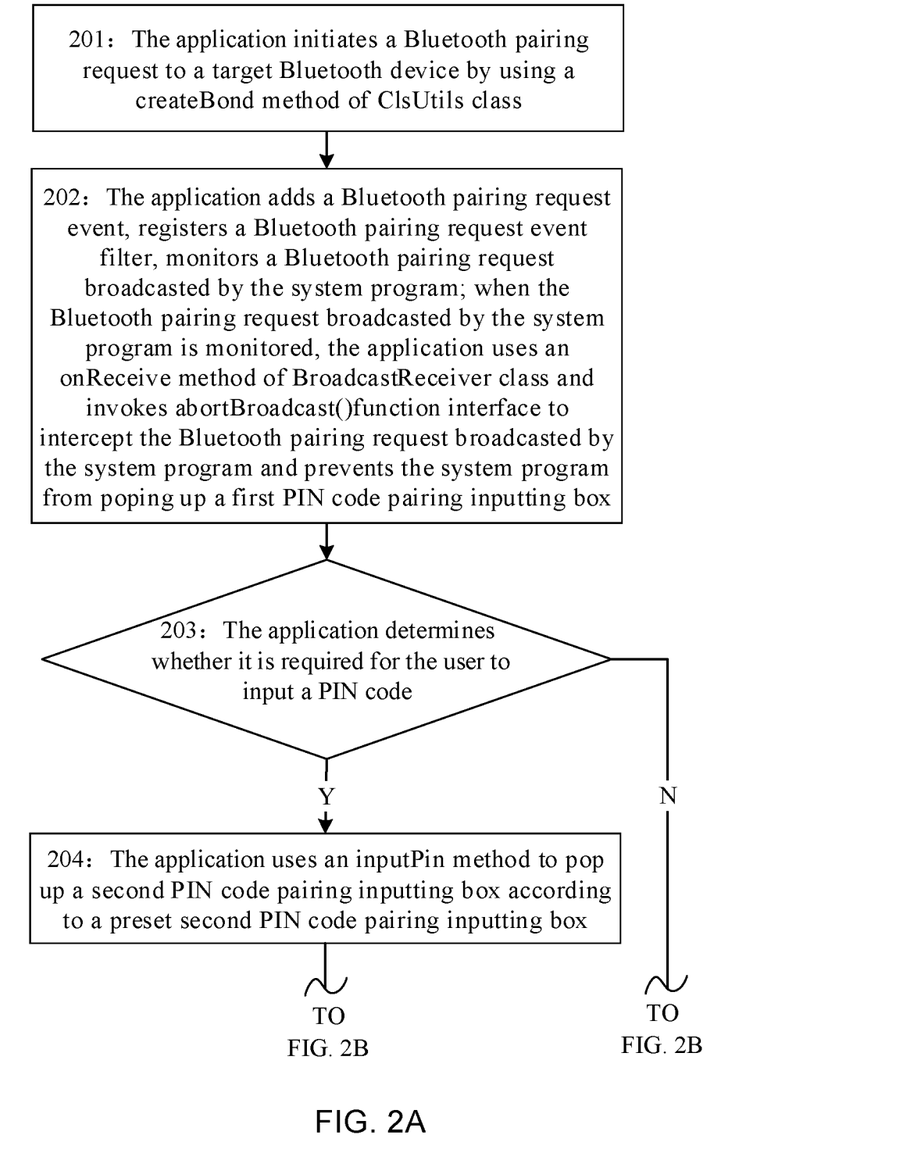
FIGS. 2A and 2B are flow charts of a method for pairing a Bluetooth device with a mobile device provided by Embodiment 2 of the present disclosure.
Figure 2B:
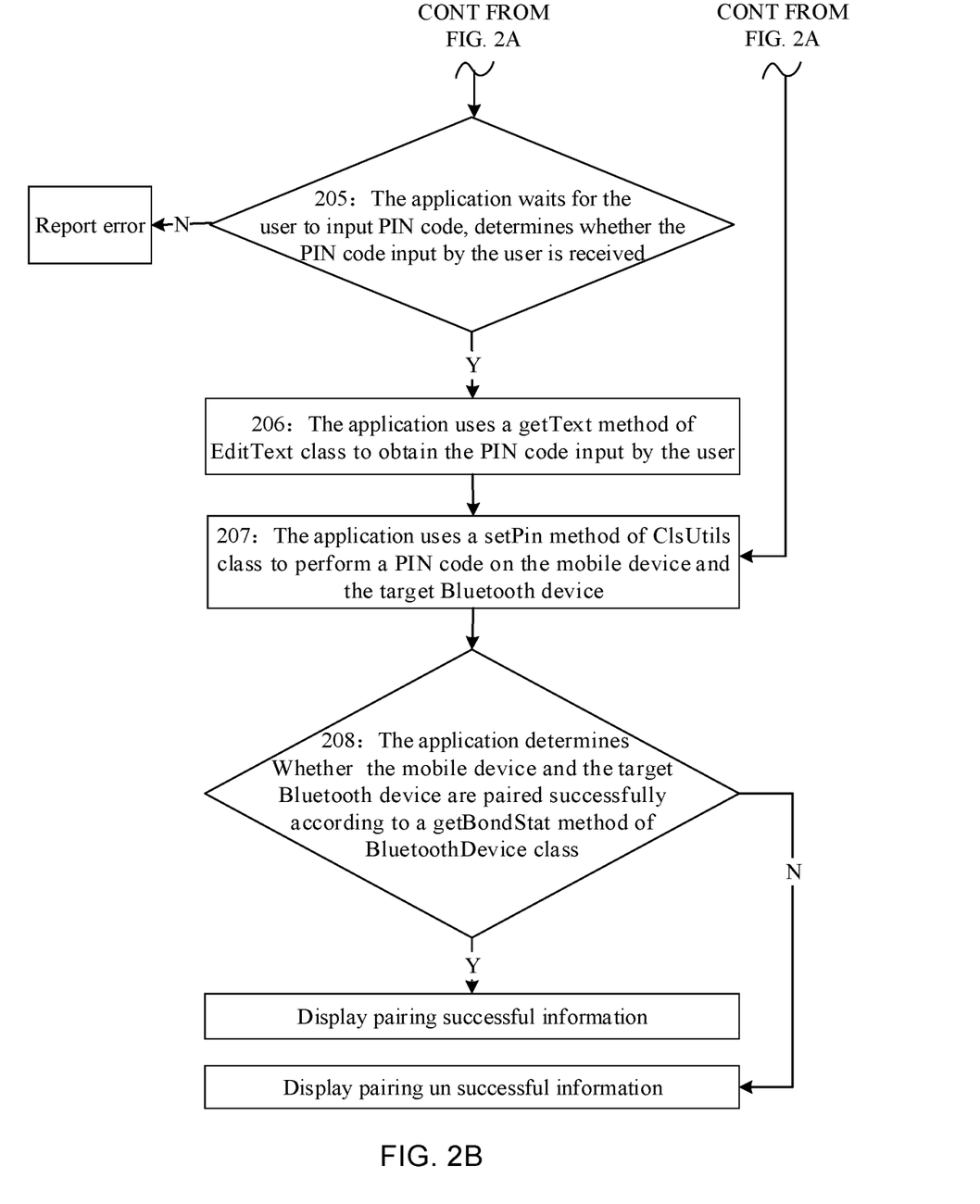

As shown by FIGS. 2A and 2B, Embodiment 2 provides a method for pairing a Bluetooth device with a mobile device. The method includes the following steps:

in the present embodiment, the mobile device includes a system program and an application;

Step 201: the application initiates a Bluetooth pairing request to a target Bluetooth device by using a createBond method of ClsUtils class;

specifically, the application uses a getClass method of BluetoothDevice class to obtain class type of the target Bluetooth device, and initialize the Bluetooth pairing request by using a createBond method of ClsUtils class;

preferably, before Step 201, the method further includes the following steps:

Step a1: the application invokes postDelayed( ) function to set a time for scanning the Bluetooth device;

Step a2: the application scans Bluetooth devices within the valid scope around, when a scanning time reaches the set time for scanning the Bluetooth device, obtains the target Bluetooth device list;

specifically, the application uses a startLeScan method of BluetoothAdapter to scan the Bluetooth devices within the valid scope around, when the scanning time reaches the set time for scanning the Bluetooth device, obtains a first target Bluetooth device list according to a first screening condition;

in the present embodiment, the first screening condition is that: one kind of basic information of Bluetooth device and/or many kinds of basic information of the Bluetooth device and/or one kind of screening condition defined by the user and/or many kinds of screening conditions defined by the user;

where, the basic information of the Bluetooth device includes: Bluetooth device object (device), Bluetooth device mac address, Bluetooth device name, scan record (scanRecord) and received signal strength indication (rssi); where, parts of the Bluetooth devices can further obtain their own Bluetooth device version number, then, the basic information of the Bluetooth device can further include Bluetooth device version number; a screening condition defined by the user includes a defined typeface;

in the present embodiment, the application obtains the target Bluetooth device list according to the first screening condition specifically includes that: the application uses LeScanCallback function to obtain the target Bluetooth device list according to the first screening condition;

when the first screening condition includes a first sub-screening condition and a second sub-screening condition, Step a2 specifically includes the following sub-steps:

Step b1: the application uses a stratLeScan method of BluetoothAdapter to scan the Bluetooth device within the scope around to obtain a first target Bluetooth device list;

Step b2: the application takes a $N^{th}$ Bluetooth device of the first Bluetooth device list obtained by scanning as a current Bluetooth device;

Step b3: the application determines whether the current Bluetooth device meets the first screening sub-condition, if yes, executes Step b4; otherwise, executes Step b7;

Step b4: the application determines whether the current Bluetooth device, which the first screening sub-condition, meets the second screening sub-condition, if yes, executes Step b5; otherwise, goes to Step b7;

Step b5: the application adds the current Bluetooth device, which meets the second screening sub-condition, in a second target Bluetooth device list;

Step b6: the application updates a user interface and displays the updated second target Bluetooth device list;

Step b7: the application takes a $N+1^{th}$ Bluetooth device or a $N-1^{th}$ Bluetooth device in the first target Bluetooth list as the current Bluetooth device, goes back to Step b2; where, N is an integer greater than 0;

when the set scanning time is reached, the updated second target Bluetooth device list is the target Bluetooth device list;

for example, in the present embodiment, the first screening sub-condition can be Bluetooth device name, and the second screening sub-condition includes typeface of U2F;

in the above steps, the basic information of the Bluetooth device can be: Bluetooth device object (device), Bluetooth device mac address, Bluetooth device name, scan record (scanRecord) and received signal strength indication (rssi), etc.; the user can further define some screening conditions;

some Bluetooth devices can obtain their own Bluetooth device version number; then, the basic information of the Bluetooth device can further include the Bluetooth device version number;

in the present embodiment, the valid scope which can be scanned by the application may be varied according to different Bluetooth core specification versions, where, the valid scanning scope of the Bluetooth 4.0 core specification standard is 100 meters; in addition, the valid scope may be varied according to different application fields even for a same Bluetooth core specification version;

specifically, in the present embodiment, after the application began to scan the Bluetooth devices within the valid scope around and before the application obtains the target Bluetooth device list, the method further includes that: the application invokes a stopLeScan method of BluetoothAdapter class to terminate scanning;

Step a3: when information of the target Bluetooth device selected by the user from the target Bluetooth device list is received, the application determines whether the mobile device has successfully paired with the target Bluetooth device corresponding to the information of the target Bluetooth device selected by the user, if yes, the pairing is successful; otherwise, the pairing is unsuccessful, and then executes Step 201;

specifically, when the information of the target Bluetooth device selected by the user from the target Bluetooth device list is received, the application uses a return value of a getBondState method of BluetoothDevice class to determine whether the device has been successfully paired with the target Bluetooth device selected by the user, if the return value is successful binding, the pairing is successful; otherwise, the pairing is unsuccessful, and then executes Step 201;

in the present embodiment, before Step 201, the application can preset a first Bluetooth device in the target Bluetooth device list as the target Bluetooth device; then, Step a3 can be replaced by that:

the application determines whether the mobile device has been successfully paired with the preset target Bluetooth device, if yes, the pairing is successful; otherwise, the pairing is unsuccessful, and executes Step 201;

Step 202: the application adds a Bluetooth pairing request event, registers a Bluetooth pairing request event filter, monitors a Bluetooth pairing request broadcasted by the system program; when the Bluetooth pairing request broadcasted by the system program is monitored, the application uses an onReceive method of BroadcastReceiver class and invokes abortBroadcast( ) function interface to intercept the Bluetooth pairing request broadcasted by the system program and prevents the system program from popping up a first PIN code pairing inputting box;

specifically, the application adds the Bluetooth pairing request event and registers the Bluetooth pairing request event filter is that the application adds the Bluetooth pairing request event by using an addAction method of IntentFilter class and registers the Bluetooth pairing request event filter by using a registerReceiver method.

where, the Bluetooth pairing request event is specifically: android.bluetooth.device.action.PAIRING_REQUEST;

specifically, in the present embodiment, the application registers a broadcast receiver in the event filter to which the Bluetooth pairing request event is added; where, the broadcast receiver is configured to monitor the Bluetooth pairing request broadcasted by the system program;

Step 203: the application determines whether it is required for the user to input a PIN code, if yes, executes Step 204; otherwise, executes Step 207;

preferably, in the present embodiment, the application determines whether it is required for the user to input the PIN code according to a UUID character of the target Bluetooth device, if yes, executes Step 204; otherwise, executes Step 207; in the present embodiment, the UUID character of the target Bluetooth device is one basis for the application to determine whether it is required for the user to input the PIN code; in the present embodiment, other conditions can be preset to determine whether it is required for the user to input the PIN code;

Step 204: the application uses an inputPin method to pop up a second PIN code pairing inputting box according to a preset second PIN code pairing inputting box;

specifically, the application presets a left corner coordinate position of the preset second PIN code pairing inputting box, a length and a width of the second PIN code pairing inputting box, according to which the application uses a setTitle method, a setView method and a setPositiveButton method of AlertDialog.Builder class in an inputPin method to set title, displayed content and key displaying content and action to be triggered by clicking a key respectively;

preferably, the displayed content of the pPIN code pairing inputting box is: "input a PIN code please", a PIN code pairing inputting box for receiving the PIN code input by the user, "OK", and "cancel";

in the present embodiment, the application preset standard of popping up the second PIN code pairing inputting box;

Step 205: the application waits for the user to input PIN code, determines whether the PIN code input by the user is received, if yes, executes Step 206; otherwise, reports error;

further, before the application waits for the user to input PIN code, the method further includes that: the application sets a time for waiting for the user to input the PIN code, such as 60 seconds; if the application receives the PIN code input by the user in the time set for waiting for the user to input the PIN code, the application executes Step 206; otherwise, reports error;

Preferably, in the present embodiment, besides that the user inputs the PIN code of the target Bluetooth device, the application can obtain the PIN code of the Bluetooth device by following ways:

1> the application obtains the PIN code of the target Bluetooth device by scanning a QR code, which stores the PIN code and is displayed on a cover of the target Bluetooth device;

in this case, the cover of the Bluetooth device displays the QR code which stores the PIN code;

2> the application obtains the PIN code of the target Bluetooth device by scanning a bar code, which stores the PIN code and is displayed on the cover of the target Bluetooth device;

in this case, the cover of the Bluetooth device displays the bar code which stores the PIN code;

in the present embodiment, the ways to obtain the PIN code are varied according to ways of displaying the PIN code by the Bluetooth devices;

Step 206: the application uses a getText method of EditText class to obtain the PIN code input by the user;

Step 207: the application uses a setPin method of ClsUtils class to perform a PIN code on the mobile device and the target Bluetooth device;

for example, when the preset PIN code is 123456, a setPin method of ClsUtils invoked by the application is specifically:

ClsUtils.setPin(BleDevice.getClass( ),BleDevice, "123456");

in the program above, BleDevice is that it is required to pair the target Bluetooth device;

Step 208: the application determines whether the mobile device and the target Bluetooth device are paired successfully according to a getBondStat method of BluetoothDevice class, if yes, the application displays pairing successful information; otherwise, the application displays pairing unsuccessful information;

further, in the present embodiment, the application determines whether the mobile device and the target Bluetooth device are paired successfully according to a return value obtained by a getBondState method, when the return value is bound, the mobile device and the target Bluetooth device are paired successfully and the application displays pairing successful information; when the return value is not bound, the mobile device and the target Bluetooth device are paired unsuccessfully and the application displays pairing unsuccessful information;

further, in the present embodiment, the application sets an error count threshold, if the determining result of Step 203 is yes and the determining result of Step 208 is no, the method further includes that: the application updates an operating count and determines whether the operating count is greater than the error count threshold, if yes, the application reports error; otherwise, the application prompts the user to input again and goes back to Step 205;

further, in the present embodiment, if the determining result of Step 203 is no and the determining result of Step 208 is no, the method further includes that the application sets an error count threshold, when the mobile device and the target Bluetooth device are paired successfully, the application displays pairing successful information; when the mobile device and the target Bluetooth device are paired unsuccessfully, the application pops up a third PIN code pairing inputting box, obtains the PIN code input by the user, performs a PIN code pairing on the mobile device and the target Bluetooth device, determines whether the mobile device and the target Bluetooth device are paired successfully, when the application determines that the mobile device and the target Bluetooth device are paired unsuccessfully, the application updates an operating count and determines whether the operating count is greater than the error count threshold, if yes, the application reports error; otherwise, the application prompts the user to input again;

in the present embodiment, Step 203 can be replaced by Step 203-1: the application determines whether a PIN code is built-in, if yes, executes Step 204; otherwise, executes Step 207;

further, in the present embodiment, when the determining result of Step 203 is no and the determining result of Step 208 is no, the method further includes that: the application sets an error count threshold, updates an operating count and determines whether the operating count is greater than the error count threshold, if yes, the application reports error; otherwise the application prompts the user to input again;

further, in the present embodiment, when the determining result of Step 203-1 is yes and the determining result of Step 208 is no, the method further includes that: the application sets an error count threshold, when the mobile device and the target Bluetooth device are paired successfully, the application displays pairing successful information; when the mobile device and the target Bluetooth device are paired unsuccessfully, the application pops up a third PIN code pairing inputting box, obtains the PIN code input by the user, performs the PIN code pairing on the mobile device and the target Bluetooth device, determines whether the mobile device and the target Bluetooth device are paired successfully, when the application determines that the mobile device and the target Bluetooth device are paired unsuccessfully, the application updates an operating count and determines whether the operating count is greater than the error count threshold, if yes, the application reports error; otherwise, the application prompts the user to input again;

in the present embodiment, when it is determined that it is required for the user to input a PIN code in Step 203 and that the mobile device and the target Bluetooth device are paired successfully, after Step 208, the method further includes sett the obtained PIN code input by the user as built-in PIN code;

In the present embodiment, when it is determined that it is not required for the user to input a PIN code in Step 203 and that the mobile device and the target Bluetooth device are paired unsuccessfully, after Step 208, the method further includes: pop up a third PIN code pairing inputting box, obtain a PIN code input by the user, perform the PIN code pairing on the mobile device and the target Bluetooth device, determine whether the mobile device and the target Bluetooth device are paired successfully, when the mobile device and the target Bluetooth device are paired successfully, replace the built-in PIN code of the target Bluetooth device to be the PIN code input by the user.

In the method for pairing a Bluetooth device with a mobile device and the apparatus thereof provided by the present disclosure; when a Bluetooth pairing request initialized by a system program is monitored, an application intercepts the Bluetooth pairing request, prevents the mobile device from popping up a PIN code pairing box; if no PIN code is built in the application, a PIN code pairing inputting box is popped up, which is used for obtaining and setting the PIN code to complete subsequence Bluetooth pairing process; if a PIN code is built in the application, there is no need for a user to input the PIN code manually, and the Bluetooth paring process is completed directly, which saves the time and energy of the user is saved and provides a better user experience in terms of the connection of the Bluetooth device and the mobile device.

Embodiment 3

Figure 3:
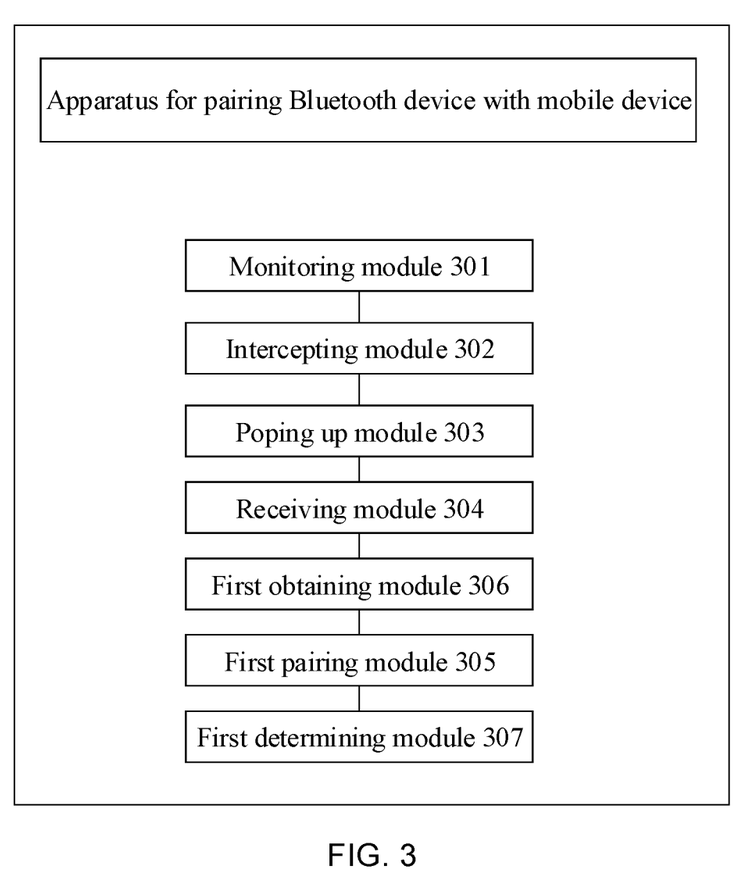
FIG. 3 is a block diagram of a module composition of an apparatus of pairing a Bluetooth device with a mobile device provided by Embodiment 3 of the present disclosure.

As shown by FIG. 3, Embodiment 3 provides an apparatus for pairing a Bluetooth device with a mobile device, including:

a monitoring module 301, configured to monitor a Bluetooth pairing request broadcasted by a system program via a filter registered in an operating system;

Further, the apparatus of the present embodiment further includes a first adding module and a registering module;

the first adding module is configured to add a Bluetooth pairing request event;

the registering module is configured to register a Bluetooth pairing request event filter after the first adding module adds the Bluetooth pairing request event;

Further, in the present embodiment, the first adding module is specifically configured to addg the Bluetooth pairing request event by using an addAction method of IntentFilter class;

the registering module is specifically configured to register the Bluetooth pairing request event filter by using a registerReceiver method;

Further, the apparatus of the present embodiment further includes a second adding module and a second determining module;

the receiving module 304 is configured to receive information of the target Bluetooth device selected by the user from a target Bluetooth device list;

the second determining module is configured to determine whether the mobile device has been successfully paired with the target Bluetooth device corresponding to the information of the target Bluetooth device selected by the user when the receiving module 304 receives the information of the target Bluetooth device;

the second adding module is further configured to add the Bluetooth pairing request event when the second determining module determines that the pairing is successful;

further, the apparatus of the present embodiment further includes: a first setting module, a scanning module and an obtaining module;

the first setting module is configured to invoke postDelayed( ) function to set a time for scanning the Bluetooth device;

the scanning module is configured to use a startLeScan method of BluetoothAdapter to scan Bluetooth devices within the valid scope around;

the obtaining module is configured to obtain the target Bluetooth device list when a scanning time of the scanning module reaches the time for scanning the Bluetooth device set by the first setting module.

an intercepting module configured to, when the monitoring module 301 monitors the Bluetooth pairing request of system program broadcast, intercept the Bluetooth pairing request of system program broadcast;

Further, in the present embodiment, the intercepting module 302 is specifically configured to intercept the Bluetooth pairing request of system program broadcasted by using an onReceive method of BroadcastReceiver class and invoke abortBroadcast( ) function interface when the monitoring module 301 monitors the Bluetooth pairing request broadcasted by the system program via the Bluetooth pairing request event filter;

further, the apparatus of the present embodiment further includes: a third determining module and a second pairing module;

the third determining module is configured to determine whether it is required for the user to input a PIN code of the target Bluetooth device;

a popping up module 303, further configured to, when the third determining module determines that it is required for the user to input the PIN code of the target Bluetooth device, pop up a PIN code pairing inputting box according to a preset PIN code pairing inputting box;

the second pairing module is configured to, when the third determining module determines that it is not required for the user to input the PIN code of the target Bluetooth device, pair the mobile device with the target Bluetooth device according to a built-in PIN code of target Bluetooth device;

a second obtaining module, further configured to obtain a pairing result of the mobile device and the second pairing module;

the first determining module 307 is further configured to determine whether the mobile device and the target Bluetooth device are paired successfully according to the pairing result obtained by the second obtaining module, if yes, the pairing is successful, otherwise, the pairing is unsuccessful;

further, the apparatus of the present embodiment further includes: a first deleting module;

the first deleting module is configured to, when the third determining module determines that it is not required for the user to input the PIN code of the target Bluetooth device and the first determining module 307 determines that the pairing with the target Bluetooth device is unsuccessful, delete the built-in PIN code of the target Bluetooth device;

further, the apparatus of the present embodiment further includes: a fourth determining module, a replacing module and a second deleting module;

the fourth determining module is configured to, when the third determining module determines that it is required for the user to input the PIN code of the target Bluetooth device and the first determining module 307 determines that the pairing with the target Bluetooth device is unsuccessful, pop up the PIN code pairing inputting box, obtain the PIN code of the target Bluetooth device input by the user via the PIN code pairing inputting box, perform a PIN code pairing on the mobile device and the target Bluetooth device, determine whether the mobile device and the target Bluetooth device are paired successfully;

the first replacing module is configured to when the fourth determining module determines that the pairing is successful, replace the built-in PIN code of the target Bluetooth device with the obtained PIN code of the target Bluetooth device;

the second deleting module is configured to, when the fourth determining module determines that the paring is unsuccessful, delete the built-in PIN code of the target Bluetooth device;

further, the apparatus of the present embodiment further includes: a fifth determining module;

the fifth determining module is configured to determine whether a built-in PIN code exists, if the fifth determining module determines that the built-in PIN code exists, pair the mobile device with the target Bluetooth device according to the built-in PIN code, determine whether the mobile device and the target Bluetooth device are paired successfully, if yes, the pairing is successful; otherwise, the pairing is unsuccessful, and then delete the built-in PIN code;

the popping up module 303 is further configured to, when the fifth determining module determines that the built-in PIN code does not exist, pop up a PIN code pairing inputting box according to the preset PIN code pairing inputting box;

further, the apparatus of the present embodiment further includes: a sixth determining module and a second replacing module;

the sixth determining module is configured to, when the fifth determining module determines that the built-in PIN code exists and the pairing of the target Bluetooth device is unsuccessful, pop up the PIN code pairing inputting box, obtain the PIN code of the target Bluetooth device input by the user via the PIN code pairing inputting box, perform the PIN code pairing on the mobile device and the target Bluetooth device, determine whether the mobile device and the target Bluetooth device are paired successfully;

the second replacing module is configured to, when the sixth determining module determines that the pairing is successful, replace the built-in code with the PIN code of the target Bluetooth device.

The apparatus of the present embodiment further includes: a second setting module, a third pairing module, a seventh determining module, a first updating module, an eighth determining module and a first error reporting module;

the second setting module is configured to, when the fifth determining module determines that the pairing is unsuccessful, set an error count threshold and set an initial operating count;

the third pairing module is configured to, after the second setting module sets the error count threshold and the initial operating count, pop up the PIN code pairing inputting box, obtain the PIN code of the target Bluetooth device input by the user via the PIN code pairing inputting box, perform the PIN code pairing on the mobile device and the target Bluetooth device, the seventh determining module is configured to determine whether the mobile device and the target Bluetooth device are paired successfully in the third pairing module;

the first updating module is configured to, when the seventh determining module determines that the pairing is unsuccessful, update the operating count;

the eighth determining module is configured to determine whether the operating count updated by the first updating module is greater than the error count threshold set by the second setting module;

the first error reporting module is configured to, when the eighth determining module determines that the operating count updated by the first updating module is greater than the error count threshold set by the second setting module, report error;

the third pairing module is configured to, when the eighth determining module determines that the operating count updated by the first updating module is not greater than the error count threshold set by the second setting module, pop up the PIN code pairing inputting box, obtain the PIN code of the target Bluetooth device, perform the PIN code pairing with the target Bluetooth device.

The popping up module 303 is configured to, when the intercepting module 302 intercepts the Bluetooth paring request broadcasted by the system program, pop up the preset PIN code pairing inputting box at an interface of the operating system;

the receiving module 304 is configured to receive the PIN code input by the user;

further, in the present embodiment, the popping up module 303 is specifically configured to pop up the preset PIN code pairing inputting box at the interface of the operating system interface according to a length, a width and a left corner coordinate position of the preset PIN code pairing inputting box;

the receiving module 304 is specifically configured to receive the PIN code input by the user;

Further, in the present embodiment, the popping up module 303 is specifically configured to pop up the preset PIN code pairing inputting box at the interface of the operating system by using an inputPin method;

the receiving module 304 is specifically configured to receive the PIN code input by the user.

the first pairing module 305 is configured to pair the mobile device with the target Bluetooth device according to the PIN code input by the user received by the receiving module 304;

Further, in the present embodiment, the first pairing module 305 specifically is configured to pair the mobile device with the target Bluetooth device according to the PIN code input by the user by using a setPin method of Clsutils class.

the first obtaining module 306 is configured to obtain a pairing result of the first pairing module 305;

the first determining module 307 is configured to determine whether the mobile device and the target Bluetooth device are paired successfully according to the pairing result obtained by the first obtaining module 306, if yes, the pairing is successful, otherwise, the pairing is unsuccessful.

In the present embodiment, the first determining module 307 is specifically configured to determine whether the mobile device and the target Bluetooth device are paired successfully according to a getBondState method of BluetoothDevice class;

further, the apparatus of the present embodiment further includes: a third setting module;

the third setting module is configured to, when the first determining module 307 determines that the pairing is unsuccessful, set the obtained PIN code of the target Bluetooth device as the built-in PIN code;

further, the apparatus of the present Embodiment further includes a fourth setting module, a fourth pairing module, a ninth determining module, a second updating module, a tenth determining module and a second error reporting module;

the fourth setting module is configured to, when the first determining module 307 determines that the pairing is unsuccessful, set an error count threshold and set an initial operating count;

the fourth pairing module is configured to, after the fourth setting module sets the error count threshold and the initial operating count, pop up the PIN code pairing inputting box, obtain the PIN code of the target Bluetooth device input by the user via the PIN code pairing inputting box, perform the PIN code pairing on the mobile device and the target Bluetooth device;

the ninth determining module is configured to determine whether the mobile device and the target Bluetooth device are paired successfully in the fourth pairing module;

the second updating module is configured to, when the ninth determining module determines that the pairing is unsuccessful, update the operating count;

the tenth determining module is configured to determine whether the operating count updated by the second updating module is greater than the error count threshold;

the second error reporting module is configured to, when the tenth determining module determines that the operating count updated by the second updating module is greater than the threshold value for permitting error times, report error;

the fourth pairing module is further configured to, when the tenth determining module determines that the operating count updated by the second updating module is not greater than the error count threshold, pop up the PIN code pairing inputting box, obtain the PIN code of the target Bluetooth device input by the user via the PIN code pairing inputting box, perform the PIN code pairing on the mobile device and the target Bluetooth device;

Further, the apparatus of the present embodiment further includes a displaying module;

the displaying module is configured to display pairing successful information when the first determining module determines that the pairing is successful; and, display pairing unsuccessful information when the first determining module determines that the pairing is unsuccessful, In the method for pairing a Bluetooth device with a mobile device and the apparatus thereof provided by the present disclosure; when a Bluetooth pairing request initialized by a system program is monitored, an application intercepts the Bluetooth pairing request, prevents the mobile device from popping up a PIN code pairing box; if no PIN code is built in the application, a PIN code pairing inputting box is popped up, which is used for obtaining and setting the PIN code to complete subsequence Bluetooth pairing process; if a PIN code is built in the application, there is no need for a user to input the PIN code manually, and the Bluetooth paring process is completed directly, which saves the time and energy of the user is saved and provides a better user experience in terms of the connection of the Bluetooth device and the mobile device.

The above are only preferred embodiments of the present disclosure, however, the protection scope of the present disclosure is not limited thereto. Any modification or substitutions that can be easily envisaged by those of skill in the art within the technical scope disclosed by the present disclosure are intended to be included within the protection scope of the present disclosure. Therefore, the protection scope of the present disclosure should be based on the protection scope of the claims.

What is claimed is:

1. A method for pairing a Bluetooth device with a mobile device, comprising:
    step 101, monitoring a Bluetooth pairing request broadcasted by a system program via a filter registered in an operating system;
    step 102, intercepting the Bluetooth pairing request broadcasted by the system program when the Bluetooth pairing request broadcasted by the system program is monitored via the filter;
    step 103, popping up a preset PIN code pairing inputting box at an interface of the operating system and receiving a PIN code input by a user;
    step 104, pairing the mobile device with a target Bluetooth device according to the PIN code input by the user; and
    step 105, obtaining a pairing result of pairing the mobile device with the target Bluetooth device, determining whether the mobile device and the target Bluetooth device are paired successfully according to the pairing result of pairing the mobile device with the target Bluetooth device, if yes, a paring is successful; otherwise, the pairing is unsuccessful.

2. The method of claim 1, wherein before step 101, the method further comprises step A: adding a Bluetooth pairing request event, registering a Bluetooth pairing request event filter.

3. The method of claim 2, wherein step A specifically is:
    adding the Bluetooth pairing request event by using an addAction method of IntentFilter class and registering the Bluetooth pairing request event filter by using registerReceiver method.

4. The method of claim 1, wherein before step 101, the method further comprises step B, when receiving information of the target Bluetooth device selected by the user from a target Bluetooth device list, determining whether the mobile device and the target Bluetooth device corresponding to the information of the target Bluetooth device selected by the user are paired successfully, if yes, the pairing is successful;
    otherwise, executing step 101.

5. The method of claim 1, wherein between step 102 and step 103, the method further comprises determining whether it is required for the user to input a PIN code of the target Bluetooth device, if yes, executing step 103;
    otherwise, pairing the mobile device with the target Bluetooth device according to a built-in PIN code of the target Bluetooth device, and then executing step 105.

6. The method of claim 1, wherein between step 102 and step 103, the method comprises: determining whether a built-in PIN code exists, if it is determined that the built-in PIN code exists, pairing the mobile device with the target Bluetooth device according to the built-in PIN code, determining whether the mobile device and the target Bluetooth device are paired successfully, if yes, the pairing is successful;
    otherwise, the pairing is unsuccessful, then deleting the built-in PIN code; if it is determined that the built-in PIN code does not exist, executing step 103.

7. The method of claim 1, step 103 specifically is:
    popping up the preset PIN code pairing inputting box at the interface of the operating system according to a length, a width and a left corner coordinate position of the preset PIN code pairing inputting box, receiving the PIN code input by the user.

8. The method of claim 1, wherein in step 105, the determining whether the mobile device and the target Bluetooth device are paired successfully is specifically: determining whether the mobile device and the target Bluetooth device are paired successfully according to a getBondState method of BluetoothDevice class.

9. The method of claim 1, wherein after it is determined that the mobile device and the target Bluetooth device are paired successfully in step 105, the method further comprises: setting an obtained PIN code of the target Bluetooth device as a built-in PIN code.

10. The method of claim 1, wherein after it is determined that the mobile device and the target Bluetooth device are paired unsuccessfully in step 105, the method further comprises:
    step D1, setting an error count threshold and setting an initial operating count; and
    step D2, popping up the PIN code pairing inputting box, obtaining a PIN code of the target Bluetooth device input by the user via the PIN code pairing inputting box, performing a PIN code pairing on the mobile device and the target Bluetooth device, determining whether the mobile device and the target Bluetooth device are paired successfully, if the mobile device and the target Bluetooth device are not paired successfully, updating the operating count and determining whether the operating count is greater than the error count threshold, if yes, reporting error, otherwise, go back to step D2.

11. The method of claim 1, wherein step 105 further comprises: displaying pairing successful information when it is determined that the pairing is successful; displaying pairing unsuccessful information when it is determined that the pairing is unsuccessful.

12. An apparatus for pairing a Bluetooth device with a mobile device, comprising: a memory, a processor, and a computer program stored on the memory and operable on the processor, wherein the processor, when running the computer program, is configured to:
monitor a Bluetooth pairing request broadcasted by a system program via a filter registered in an operating system;
intercept the Bluetooth pairing request broadcasted by the system program when the processor monitors the Bluetooth pairing request broadcasted by the system program;
pop up a preset PIN code pairing inputting box at an interface of the operating system when the processor intercepts the Bluetooth pairing request broadcasted by the system program;
receive a PIN code input by a user;
pair the mobile device with a target Bluetooth device according to the PIN code input by the user;
obtain a pairing result; and
determine whether the mobile device and the target Bluetooth device are paired successfully according to the pairing result obtained, if yes, a pairing between the mobile device and the target Bluetooth device is successful, otherwise, the pairing is unsuccessful.

13. The apparatus of claim 12, wherein the processor is further configured to:
add a Bluetooth pairing request event; and
register a Bluetooth pairing request event filter after the processor adds the Bluetooth pairing request event.

14. The apparatus of claim 12, wherein the processor is further configured to:
receive information of the target Bluetooth device selected by the user from a target Bluetooth device list;
determine whether the mobile device and the target Bluetooth device corresponding to the information of the target Bluetooth device selected by the user are paired successfully when receiving the information of the target Bluetooth device; and
add the Bluetooth pairing request event when the processor determines that the pairing is successful.

15. The apparatus of claim 12, wherein the processor is further configured to:
determine whether a built-in PIN code exists, if the processor determines that the built-in PIN code exists, pair the mobile device with the target Bluetooth device according to the built-in PIN code, determine whether the mobile device and the target Bluetooth device are paired successfully, if yes, the pairing is successful; otherwise, the pairing is unsuccessful, delete the built-in PIN code; and
when the processor determines that the built-in PIN code does not exist, pop up a PIN code pairing inputting box according to the preset PIN code pairing inputting box.

16. The apparatus of claim 12, wherein the processor is specifically configured to:
pop up the preset PIN code pairing inputting box at the interface of the operating system according to a length, a width and a left corner coordinate position of the preset PIN code pairing inputting box; and
receive the PIN code input by the user.

17. The apparatus of claim 12, wherein the processor is specifically configured to:
pop up the preset PIN code pairing inputting box at the interface of the operating system by using an inputPin method; and
receive a PIN code input by the user.

18. The apparatus of claim 12, wherein the processor is specifically configured to:
pair the mobile device with the target Bluetooth device according to the PIN code input by the user by using a setPin method of Clsutils class.

19. The apparatus of claim 12, wherein the processor is specifically configured to:
determine whether the mobile device and the target Bluetooth device are paired successfully according to a getBondState method of BluetoothDevice class.

20. The apparatus of claim 12, wherein the processor is further configured to:
when the processor determines that the pairing is unsuccessful, set an obtained PIN code of the target Bluetooth device as a built-in PIN code.

* * * * *